United States Patent
Zhao et al.

(10) Patent No.: US 9,616,879 B2
(45) Date of Patent: Apr. 11, 2017

(54) BATTERY STATE OF CHARGE CONTROL WITH PREVIEW INFORMATION CLASSIFICATION

(71) Applicant: Ford Global Technologies, LLC, Dearborn, MI (US)

(72) Inventors: Yanan Zhao, Ann Arbor, MI (US); Wei Liang, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 14/712,351

(22) Filed: May 14, 2015

(65) Prior Publication Data

US 2016/0332616 A1   Nov. 17, 2016

(51) Int. Cl.
  *B60L 11/18*    (2006.01)
  *B60W 20/13*   (2016.01)
  *B60W 20/12*   (2016.01)

(52) U.S. Cl.
  CPC .......... *B60W 20/13* (2016.01); *B60L 11/1862* (2013.01); *B60W 20/12* (2016.01); *B60W 2510/244* (2013.01); *B60W 2550/142* (2013.01); *Y10S 903/907* (2013.01)

(58) Field of Classification Search
  CPC ................ B60W 20/13; B60W 20/12; B60W 2550/142; B60W 2510/244; B60L 11/1862; Y10S 903/907
  See application file for complete search history.

(56) References Cited

U.S. PATENT DOCUMENTS

| | | | | |
|---|---|---|---|---|
| 5,778,326 A | * | 7/1998 | Moroto | B60K 6/485 180/65.26 |
| 5,832,396 A | * | 11/1998 | Moroto | B60K 6/485 180/65.26 |
| 5,892,346 A | * | 4/1999 | Moroto | B60K 6/485 318/139 |
| 6,374,173 B1 | * | 4/2002 | Ehlbeck | B60K 31/047 180/170 |
| 6,487,477 B1 | | 11/2002 | Woestman et al. | |
| 8,108,136 B2 | | 1/2012 | Filev et al. | |
| 8,538,619 B2 | | 9/2013 | Syed et al. | |
| 2002/0188387 A1 | * | 12/2002 | Woestman | B60K 6/365 701/22 |
| 2013/0113435 A1 | * | 5/2013 | Boschker | B60L 11/1861 320/134 |
| 2014/0067183 A1 | | 3/2014 | Sisk | |
| 2015/0069969 A1 | * | 3/2015 | Wu | H02J 7/0047 320/109 |

FOREIGN PATENT DOCUMENTS

| | | | | |
|---|---|---|---|---|
| CN | 202499132 U | * | 10/2012 | |
| JP | 3336777 B2 | * | 10/2002 | ............. B60K 6/485 |
| WO | 2008128416 A1 | | 10/2008 | |

* cited by examiner

*Primary Examiner* — Rodney Butler
(74) *Attorney, Agent, or Firm* — David Kelley; Brooks Kushman P.C.

(57) ABSTRACT

In a vehicle, a controller divides a route into route segments. The controller operates a traction battery over the route segments to achieve a target state of charge upon completion of one of the route segments. The target state of charge is based on a target battery power defined by a classification for each of the route segments including the one of the route segments according to a set of fuzzy rules applied to vehicle acceleration and road grade associated with the route segments. Fuzzy rules may be applied to the classification for each of the route segments.

20 Claims, 4 Drawing Sheets

BATTERY STATE OF CHARGE CONTROL WITH PREVIEW INFORMATION CLASSIFICATION

TECHNICAL FIELD

This application is generally related to operating a traction battery based on route information.

BACKGROUND

Hybrid-electric vehicles include an engine and a traction battery to provide power to operate the vehicle. Propulsion is provided by the engine and electric machines coupled to the wheels through a transmission. An energy management system may operate the engine and electric machines in various operating modes to improve fuel economy. Further, the energy management system may operate the traction battery by charging and discharging to maintain a state of charge within a given range. The state of charge is typically managed by present operating inputs such as an accelerator pedal demand or brake pedal demand.

SUMMARY

In some configurations, a vehicle includes at least one controller programmed to operate a traction battery to achieve upon completion of a present route segment a target state of charge that is based on a target battery power defined by a classification for a plurality of route segments including the present route segment that results from application of a set of fuzzy rules to vehicle acceleration and road grade associated with the route segments.

In some configurations, the vehicle includes at least one controller programmed to operate a traction battery to achieve upon completion of a present route segment a target state of charge that is based on a target battery power defined by a classification for a plurality of route segments including the present route segment that results from application of a set of fuzzy rules to wheel power demand and road grade associated with the route segments.

A method includes generating, by a controller, a classification for a plurality of route segments based on a set of fuzzy rules applied to vehicle acceleration and road grade for each of the route segments. The method further includes operating, by the controller, a traction battery over a present route segment to achieve upon completion of the present route segment a target state of charge derived from a target battery power that is based on the classification.

The method may further include generating, by the controller, the target battery power based on a second set of fuzzy rules applied to the classification for the route segments. The method may further include commanding, by the controller, an electric machine and an engine based on the target state of charge and a present state of charge to operate the traction battery.

The vehicle acceleration may be an average vehicle acceleration over each of route segments and the road grade may be an average road grade over each of the route segments.

The plurality of segments may be a number X and route segment X is a virtual segment that includes route data for a remainder of a route such that the target battery power is further defined by the classification for the virtual segment. The vehicle acceleration and road grade associated with segment X may be a weighted average vehicle acceleration for the remainder of the route and a weighted average road grade for the remainder of the route. The wheel power demand associated with segment X may be a weighted average wheel power demand for the remainder of the route.

In some configurations, the vehicle may further include a navigation module in communication with the at least one controller and the at least one controller may be further programmed to receive route information from the navigation module and derive the route segments form the route information.

The target battery power may be based on a second set of fuzzy rules applied to the classification for each of the route segments. The target battery power may be based on a predetermined table that is indexed by the classification for each of the route segments.

The target state of charge may be further based on a present state of charge of the traction battery. Each of the route segments may be mapped to a single classification selected from a plurality of possible classifications. The route segments may be a portion of a route characterized by one or more of a powertrain operating mode, the vehicle acceleration, and the road grade.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
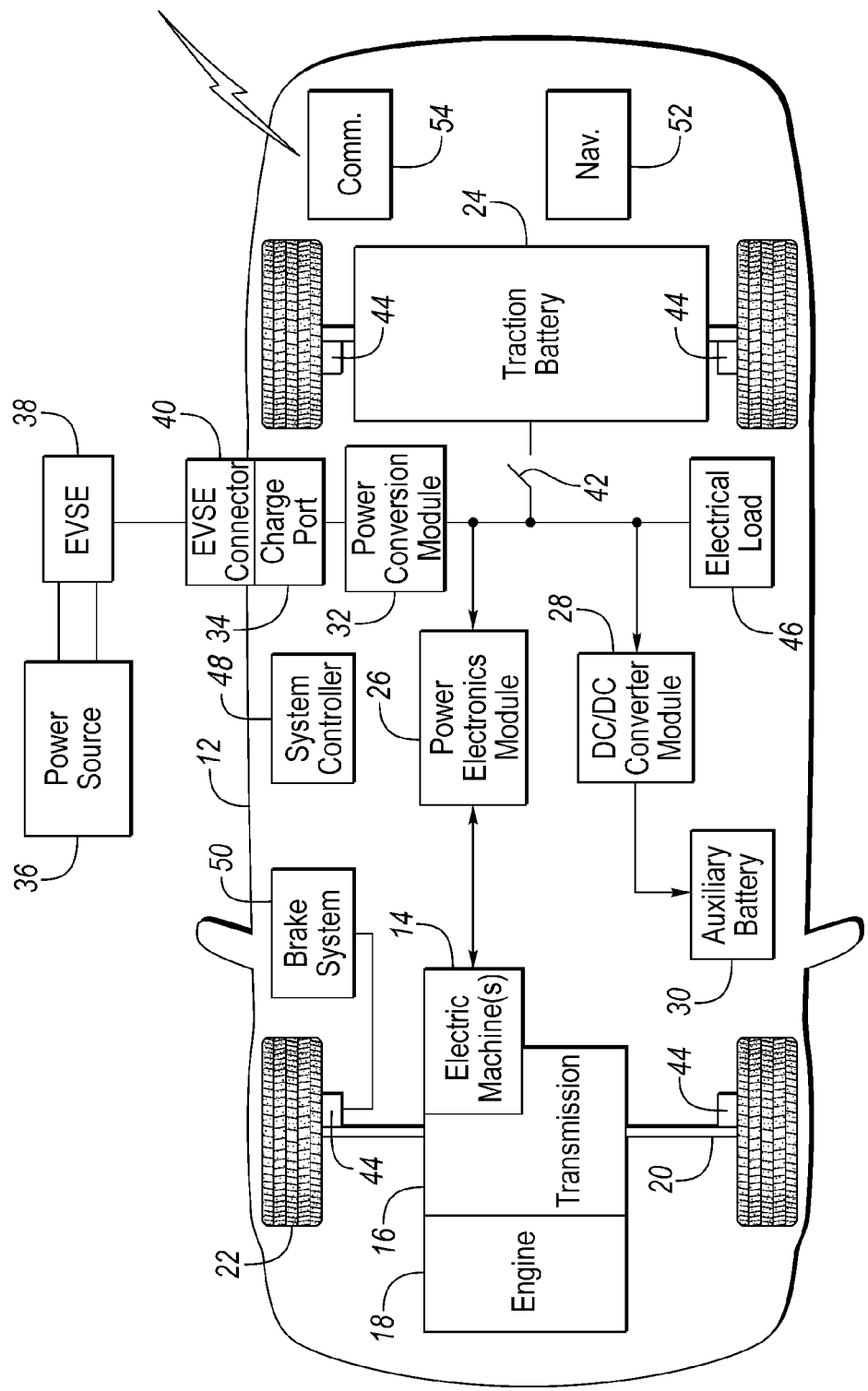
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 12 may comprise one or more electric machines 14 mechanically coupled to a hybrid transmission 16. The electric machines 14 may be capable of operating as a motor or a generator. In addition, the hybrid transmission 16 is mechanically coupled to an engine 18. The hybrid transmission 16 is also mechanically coupled to a drive shaft 20 that is mechanically coupled to the wheels 22. The electric machines 14 can provide propulsion and deceleration capability when the engine 18 is turned on or off. The electric machines 14 also act as generators and can provide fuel economy benefits by recovering energy that would normally be lost as heat in a friction braking system. The electric machines 14 may also reduce vehicle emissions by allowing the engine 18 to operate at more efficient speeds and allowing the hybrid-electric vehicle 12 to be operated in electric mode with the engine 18 off under certain conditions.

A traction battery or battery pack 24 stores energy that can be used by the electric machines 14. A vehicle battery pack 24 typically provides a high voltage DC output. The traction battery 24 is electrically coupled to one or more power electronics modules. One or more contactors 42 may isolate the traction battery 24 from other components when opened and connect the traction battery 24 to other components when closed. The power electronics module 26 is also electrically coupled to the electric machines 14 and provides the ability to bi-directionally transfer energy between the traction battery 24 and the electric machines 14. For example, a traction battery 24 may provide a DC voltage while the electric machines 14 may operate with a three-phase AC current to function. The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A vehicle 12 may include a DC/DC converter module 28 that converts the high voltage DC output of the traction battery 24 to a low voltage DC supply that is compatible with low-voltage vehicle loads. An output of the DC/DC converter module 28 may be electrically coupled to an auxiliary battery 30 (e.g., 12V battery). The low-voltage systems may be electrically coupled to the auxiliary battery. Other high-voltage loads 46, such as compressors and electric heaters, may be coupled to the high-voltage output of the traction battery 24.

The vehicle 12 may be an electric vehicle or a plug-in hybrid vehicle in which the traction battery 24 may be recharged by an external power source 36. The external power source 36 may be a connection to an electrical outlet. The external power source 36 may be electrically coupled to a charger or electric vehicle supply equipment (EVSE) 38. The external power source 36 may be an electrical power distribution network or grid as provided by an electric utility company. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically coupled to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically coupled or connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 may be coupled to the high-voltage bus. The electrical loads 46 may have an associated controller that operates and controls the electrical loads 46 when appropriate. Examples of electrical loads 46 may be a heating module or an air-conditioning module.

Electronic modules in the vehicle 12 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 30. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 12. A vehicle system controller (VSC) 48 may be present to coordinate the operation of the various components.

Figure 2:
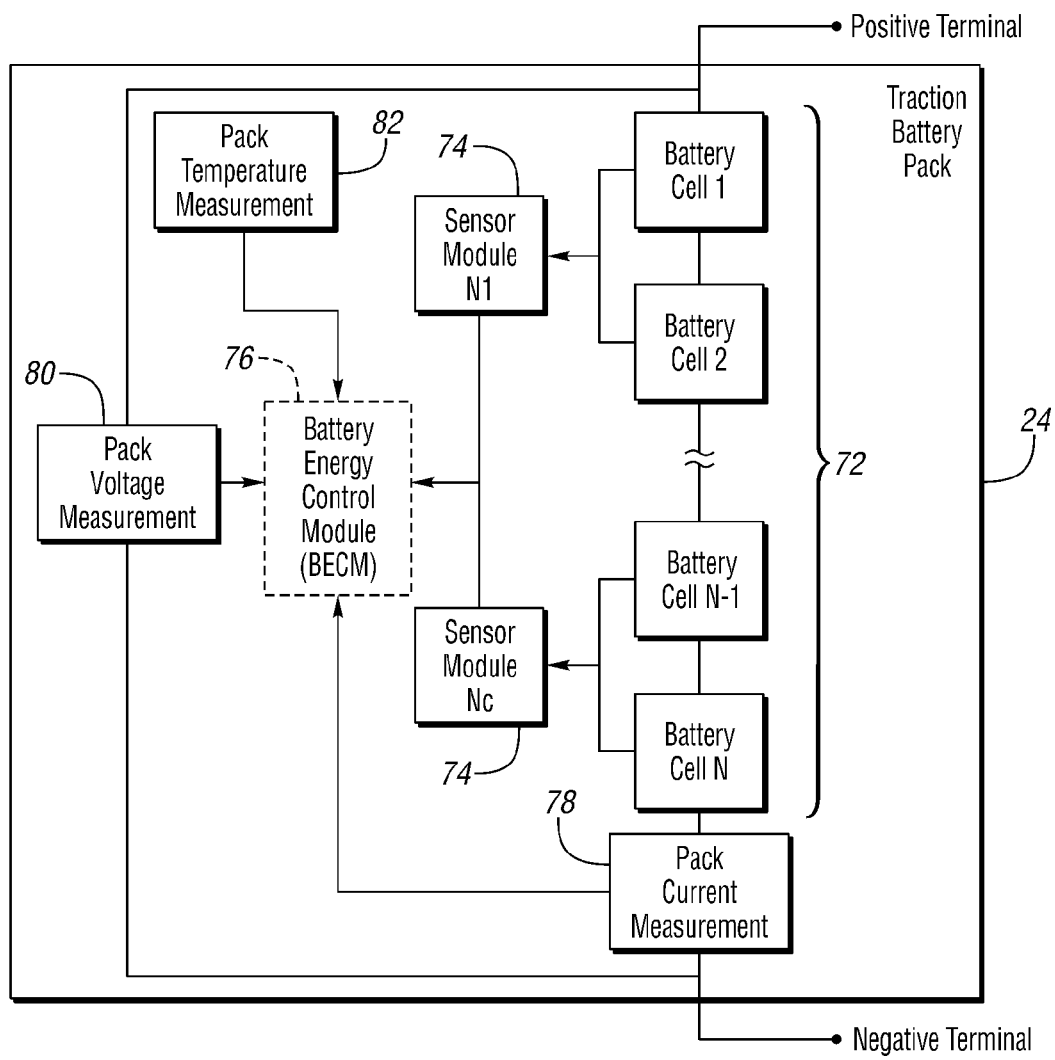
FIG. 2 is a diagram of a possible battery pack arrangement comprised of multiple cells, and monitored and controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a simple series configuration of N battery cells 72. Other battery packs 24, however, may be composed of any number of individual battery cells connected in series or parallel or some combination thereof. A battery management system may have a one or more controllers, such as a Battery Energy Control Module (BECM) 76, that monitor and control the performance of the traction battery 24. The battery pack 24 may include sensors to measure various pack level characteristics. The battery pack 24 may include one or more pack current measurement sensors 78, pack voltage measurement sensors 80, and pack temperature measurement sensors 82. The BECM 76 may include circuitry to interface with the pack current sensors 78, the pack voltage sensors 80 and the pack temperature sensors 82. The BECM 76 may have non-volatile memory such that data may be retained when the BECM 76 is in an off condition. Retained data may be available upon the next key cycle.

In addition to the pack level characteristics, there may be battery cell 72 level characteristics that are measured and monitored. For example, the terminal voltage, current, and temperature of each cell 72 may be measured. A system may use a sensor module 74 to measure the battery cell 72 characteristics. Depending on the capabilities, the sensor module 74 may measure the characteristics of one or multiple of the battery cells 72. The battery pack 24 may utilize up to $N_c$ sensor modules 74 to measure the characteristics of all the battery cells 72. Each sensor module 74 may transfer the measurements to the BECM 76 for further processing and coordination. The sensor module 74 may transfer signals in analog or digital form to the BECM 76. In some configurations, the sensor module 74 functionality may be incorporated internally to the BECM 76. That is, the sensor module 74 hardware may be integrated as part of the circuitry in the BECM 76 and the BECM 76 may handle the processing of raw signals. The BECM 76 may also include circuitry to interface with the one or more contactors 42 to open and close the contactors 42.

It may be useful to calculate various characteristics of the battery pack. Quantities such a battery power capability and battery state of charge may be useful for controlling the operation of the battery pack as well as any electrical loads receiving power from the battery pack. Battery power capability is a measure of the maximum amount of power the battery can provide or the maximum amount of power that the battery can receive. Knowing the battery power capability allows the electrical loads to be managed such that the power requested is within limits that the battery can handle.

Battery pack state of charge (SOC) gives an indication of how much charge remains in the battery pack. The SOC may be expressed as a percentage of the total charge remaining in the battery pack. The battery pack SOC may be output to inform the driver of how much charge remains in the battery pack, similar to a fuel gauge. The battery pack SOC may also be used to control the operation of an electric or hybrid-electric vehicle. Calculation of battery pack SOC can be accomplished by a variety of methods. One possible method of calculating battery SOC is to perform an integration of the battery pack current over time. This is well-known in the art as ampere-hour integration.

An energy management system (EMS) may operate the powertrain of the vehicle to minimize fuel consumption. The powertrain may include the engine, the transmission, the electric machines and associated power electronics module, and the traction battery. The EMS may determine an operating state for the engine and the electric machines to minimize the fuel consumption of the engine. The operating state for the engine 18 may include an on/off command, an engine torque command, and an engine speed command. The operating state for the electric machines 14 may include a speed command and a torque command.

The EMS may operate the traction battery 24 to manage the state of charge of the traction battery 24. The traction battery 24 may be charged or discharged according to a target state of charge compared to a present state of charge. For example, when the present state of charge is greater than the target state of charge, the traction battery may be discharged. Operation of the traction battery 24 may be achieved by commanding a torque of the electric machines 14 to draw current from or provide current to the traction battery 24. Operation of the traction battery 24 may further involve commanding operation of the engine 18 to provide power to the electric machines 14.

The vehicle 12 may include a navigation module 52 that provides routing information to the operator. The navigation module 52 may include a vehicle position sensor compatible with the Global Positioning System (GPS). The navigation module 52 may include a display for displaying map and route information. The display may be a touchscreen that is used for input to the navigation module 52. The operator may input a destination or select a destination from memory. The navigation module 52 may output the vehicle position to other modules. The navigation module 52 may also output routing data to other modules.

The vehicle 12 may include a wireless communications module 54 to communicate with devices and systems remote from the vehicle 12. The wireless communications module 54 may include an onboard modem having an antenna to communicate with off-board devices or systems. The wireless communications module 54 may be a cellular communications device to enable communications via a cellular data network. The wireless communications module 54 may be a wireless local area network (LAN) device compatible with IEEE 802.11 family of standards (i.e., WiFi) or a WiMax network. The wireless communications module 54 may include a vehicle based wireless router to allow connection to remote networks in range of a local router. The wireless communications module 54 may interface with one or more controllers in the vehicle 12 to provide data. For example, the data may include traffic and construction data, routing instructions, and weather data. The data received via the wireless communications module 54 may be utilized by the navigation module 52 in determining a route for the vehicle 12.

Figure 3:
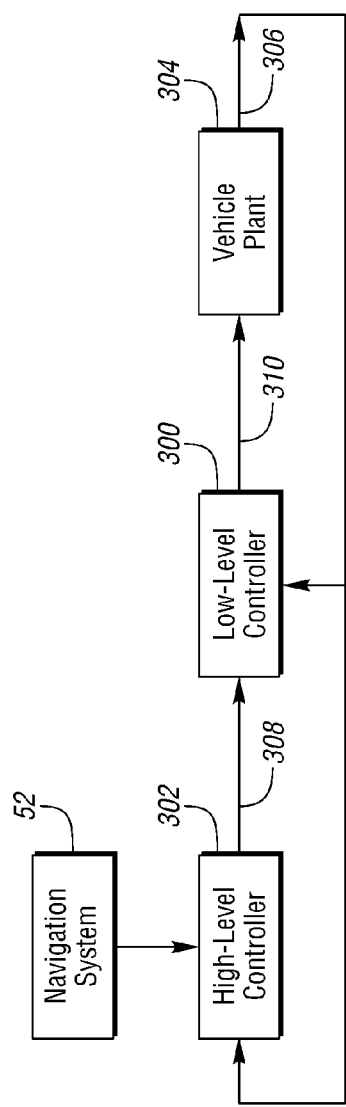
FIG. 3 is a possible controller architecture for an energy management system.

FIG. 3 depicts a possible controller architecture for implementing the EMS. In some configurations, the EMS may include a low-level controller 300 and a high-level controller 302. The high-level controller 302 may incorporate high-level energy management planning (EMP) strategies. The low-level controller 300 may implement instructions for coordinating the powertrain components. The low-level controller 300 may output various operational signals 310 to control the operation of powertrain and vehicle components. The powertrain and vehicle components are represented as a vehicle model or plant 304. The vehicle plant 304 may represent the dynamics of the vehicle in response to the operational signals 310 at the inputs. The vehicle plant 304 provides vehicle output signals 306 that may be measured by the modules. The vehicle output signals 306 may represent the measured signals or quantities.

The low-level controller 300 may provide commands to the engine 18 and electric machines 14 to meet the driver demand. The commands may include torque and speed requests. The low-level controller 300 may measure or receive inputs such as an accelerator pedal position, a brake pedal position, and a vehicle speed (inputs may be represented by the vehicle output signals 306).

The high-level controller 302 may communicate with the low-level controller via the vehicle network. The high-level controller 302 may provide high-level reference signals 308 to the low-level controller 300. The high-level reference signals 308 may include a target state of charge. The high-level controller 302 may receive route preview information from the navigation module 52. The high-level controller 302 may implement a control strategy to generate the high-level reference signals 308 based on the route preview information. The high-level controller 302 may generate the target state of charge based on the route information.

In a vehicle that includes the navigation module 52 or otherwise has a means of receiving route data or information, additional capabilities for improving fuel economy may be present. When the navigation module 52 generates a route for the operator, this additional information may be utilized to improve fuel economy. A route may be input by the operator. For example, a destination may be entered as an address and the route may be identified. In some configuration, several possible routes may be identified and the operator may be prompted to select the route that is to be followed. In some configurations, previous routes and driving habits may be learned and stored in non-volatile memory. The route may be identified based on time of day and location.

Route information may include road grade and speed limits along the route. Information such as traffic density, intersections, and stop signs along the route may be identified. The route information may include predicted vehicle position or coordinates over the route. The route information may include an expected driver power demand over the route based on a road grade profile and vehicle speed profile over the route.

The route information provided by the navigation module 52 may include a vehicle speed profile and a road grade profile. A vehicle acceleration profile may be computed from the vehicle speed profile as the rate of change of vehicle speed over predetermined intervals. A wheel power demand profile may be constructed based on the vehicle speed profile and the road grade profile. The wheel power demand profile may take into account factors such as aerodynamic drag and friction that may vary as a function of vehicle speed. The wheel power demand may be a predicted amount of power at the wheels for the vehicle to travel at the specified speed and road grade.

Route segmentation may include decomposing the intended route into a series of segments. Each segment may consist of a portion of the route having similar characteristics and attributes. Route segmentation may be accomplished using various rules to segment the intended route. Segmentation may be based on powertrain operating mode, vehicle acceleration, or road-grade. The number of segments over a route may vary based on the segment selection criteria. For example, for segments defined by vehicle acceleration, a segment may include consecutive periods of time in which the vehicle acceleration is behaving in a similar manner (e.g., accelerating, decelerating, maintaining speed).

As an example, a predicted vehicle speed profile over the intended route to the destination may be known. The predicted speed profile may be derived from the route information. The route may be segmented according to increasing or decreasing vehicle speed. For example, a continuous portion of the profile in which the vehicle speed increases may be considered to be a segment.

Figure 4:
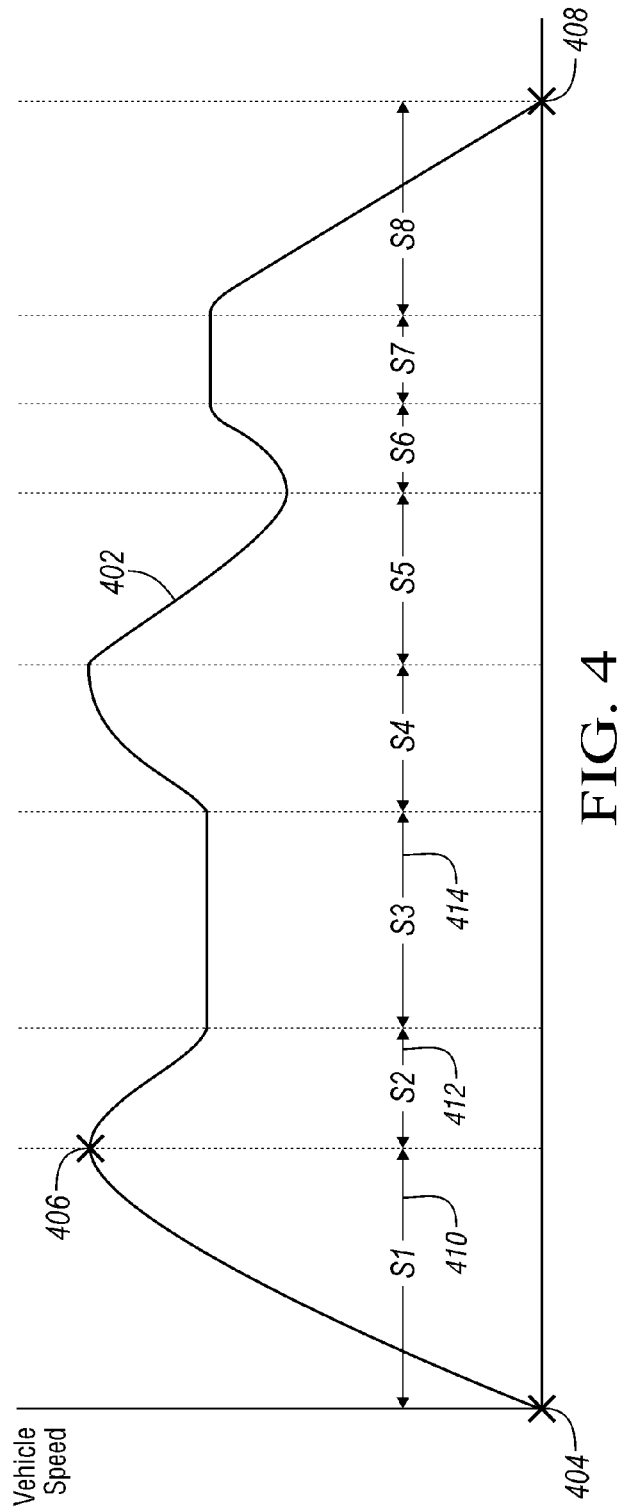
FIG. 4 is an example vehicle speed profile for a route including a possible segmentation.

FIG. 4 depicts an example vehicle speed profile 402 for a route that is segmented according to vehicle acceleration. The vehicle speed profile 402 may be over time or distance traveled. The vehicle speed profile 402 may be segmented according to the acceleration over the segments. For example, a first segment S1 410 may be defined as the portion of the vehicle speed profile 402 over which the vehicle is accelerating. This segment may be the present segment, assuming a present time or position 404. The endpoint 406 of the first segment may be the point at which the segment transitions to the second segment S2 412. A third segment S3 414 is defined that is after the second segment 412. Further segments (S4 through S8) may be defined in a similar manner. The destination 408 may be the point that defines the end of the route.

The controller 302 may process the road grade profile to characterize the road grade for each segment. For example, the road grade profile for each segment may be averaged to determine an average road grade for each segment. The average road grade may be compared to thresholds to determine a road grade classification for the each segment. As an example, the road grade for each segment may be classified as downhill, flat or uphill. The road grade may be classified as downhill for the segment when the average road grade is less than a predetermined downhill threshold. The road grade may be classified as uphill for the segment when the average road grade is greater than a predetermined uphill threshold. The road grade may be classified as flat for the segment when the average road grade is between the predetermined uphill threshold and the predetermined downhill threshold. Based on the average road grade over the segment, the vehicle may be placed into one of the road grade classes—downhill, flat, or uphill. Some configurations may include more or fewer classes of road grade.

The vehicle acceleration profile maybe computed based on the rate of change of the vehicle speed in the vehicle speed profile. The vehicle acceleration profile may be processed to characterize the vehicle acceleration for each segment. For example, the vehicle acceleration for each segment may be classified as accelerating, cruising, or decelerating. The vehicle acceleration profile may be averaged for each segment to determine an average vehicle acceleration for each segment. The average vehicle acceleration may be compared to thresholds to determine a vehicle acceleration classification for each segment. In cases in which wheel power demand is used, the wheel power demand profile may be averaged for each segment to determine an average wheel power demand for each segment. For example, the vehicle acceleration classification for the segment may be accelerating when the average vehicle acceleration is greater than a predetermined acceleration threshold. The vehicle acceleration classification for the segment may be decelerating when the average vehicle acceleration is less than a predetermined deceleration threshold. The vehicle acceleration classification for the segment may be cruising when the average vehicle acceleration is between the predetermined acceleration threshold and the predetermined deceleration threshold.

Each of the road grade and vehicle acceleration classifications may be defined as a range of values. In some configurations, the ranges may overlap. That is, it may be possible for the road grade or vehicle acceleration to be characterized as being in more than one of the classifications. For example, the road grade may be characterized as a fuzzy set that has overlapping membership functions (e.g., triangular or trapezoidal). In such a configuration, it may be possible that a particular segment is characterized as being a member of more than one classification. Associated with the membership may be a membership value for each classification that defines the relative membership for each classification. For example, the road grade may be classified as being uphill with membership value of 20% and flat with membership value of 80%. The summation of the membership values may be 100%. The membership values may represent the relative certainty of the classification for that class.

Each segment may be classified according to road grade and vehicle acceleration behavior. The segments may also be classified according to road grade and wheel power demand. Table 1 depicts one possible classification based on road grade and vehicle acceleration for the segment. In some configurations, more classifications may be defined. As classifications are added, computational time and storage requirements may increase. For each segment, the road grade and vehicle acceleration that characterize the segment may be utilized to determine the classification. The classification may be implemented with a table or a set of fuzzy rules in the controller 302.

The classification for a configuration in which the classification ranges are not overlapping is relatively simple. In this case, a route segment may be mapped to a single classification from the plurality of possible classifications. The characterization of road grade and vehicle acceleration for the segment defines the classification for the segment. The membership values for this configuration may be considered to be 100%. For example, the road grade may be classified as downhill and the vehicle acceleration may be classified as deceleration. Based on this road grade classification and vehicle acceleration classification, the segment may be mapped into Class 9. The controller 302 may implement a predetermined table indexed by road grade and vehicle acceleration indices to determine the classification.

TABLE 1

| Vehicle Acceleration | Road Grade | | |
|---|---|---|---|
| | Uphill | Flat | Downhill |
| Accelerating | Class 1 | Class 4 | Class 7 |
| Cruising | Class 2 | Class 5 | Class 8 |
| Decelerating | Class 3 | Class 6 | Class 9 |

The controller 302 may implement a fuzzy logic control scheme using a set of fuzzy rules to classify the route segments. The classification for a configuration in which the classification ranges may overlap involves more computations. For example, the vehicle acceleration may be classified as cruising with a membership value of 100% and the road grade may be classified as being uphill with membership value of 20% and flat with membership value of 80%. This characterization results in the segment being mapped into Class 2 and Class 5. Associated with the classes may be a membership value that indicates the likelihood of membership in each of the classes. In this example, the Class 2 membership value may be 20% (0.2×1) and the Class 5 membership may be 80% (0.8×1).

The EMS may consider a predetermined number of segments to set powertrain operating parameters for the present segment. The predetermined number may be selected based on processing power or storage limitations of the controller. The predetermined number may be a number X. The route may include a number of remaining segments that is greater than X. In the case in which the number of remaining segments is greater than the predetermined number of segments to be processed, a virtual segment may be defined. The virtual segment may incorporate the remaining segments of the route. That is, segment X may be a virtual segment that includes the remainder of the route. For example, in some configurations three segments may be defined. The first segment may be the immediately upcoming route segment (e.g., from the present position). The second may be the immediately following segment. The third segment may be defined as a virtual segment including the route information from the end of the second segment until the end of the route (e.g., the destination).

Within each route segment, the vehicle acceleration may be categorized into one or more of the defined vehicle acceleration classifications. Within each segment, the road grade may be categorized into one or more of the road grade classifications. In a configuration in which the ranges do not overlap, the pairs of values may be mapped to a single class. In a configuration in which the ranges overlap, segments may be mapped into multiple classifications with an associated weighting value.

The desired or target battery power for each segment may be a function of the classification for each of the segments. In a configuration that utilizes N segments, the desired battery power may be expressed as:

$$P_{BattDes} = f(segClass_{seg1}, segClass_{seg2}, \ldots segClass_{segN}) \quad (1)$$

In some configurations, a table may be stored in non-volatile memory of the controller 302 that includes a target battery power for each combination of N segments. In practice, the route may be divided into a small number of segments (e.g., two or three) to limit storage and processing requirements. The table may be populated based on expert knowledge of the various combinations of segments. The desired battery power may be expressed in generic terms. For example, desired battery power may be classified in various output levels such a discharge high, discharge low, charge low, and charge high. Each output level may be mapped to a specific battery power level (in Watts or Kilowatts).

For example, in a configuration utilizing two segments, the first segment classification and the second segment classification may be used as indices for the table. As an example, consider that the first segment is uphill at a relatively constant speed (e.g., Class 2). Also, consider the second segment being a flat road with vehicle deceleration (e.g., Class 6). In this scenario, it appears that in the second segment that the vehicle decelerates so that the battery may be charged via regenerative braking Knowing about the potential increase in battery state of charge due to regenerative braking in advance, the system may compensate in the present segment by using more battery power in the present segment. Under these conditions, the desired battery power level for the present segment may be set to discharge low.

In configurations in which membership in more than one class is possible, the desired battery power may be a weighted version of the output levels. In such cases, the output may be a weighted average of the members. A relative membership value may be associated with each classification such that the sum of all the relative membership values is one. The final battery power output level may be the summation of the products of the battery power output level for each classification and the associated relative membership value. A benefit of this control strategy is that the basic strategy and generic actions are applicable to all vehicles. The actual desired battery power values may be calibrated to the particular vehicle based on the traction battery 24 and electric machine 14 capabilities.

In some configurations, the classifications may be defined as a set of fuzzy classes such that a given route segment may be a member of more than one class. The classes may be weighted by a membership function that indicates the relative class membership for each class. The fuzzy classes may be utilized with the table structure as described except that more than one result may be obtained. The final target battery power value may be a weighted average of the outputs from the table. For example, in a configuration using two segments, each segment may be a member in two classes. A target battery power may be determined from the possible combinations of classes between the first and second segments. The resulting target battery powers for each combination may be weighted by the relative membership functions associated with the combination. The final target battery power may be a sum of the weighted values.

The target battery power may be utilized to compute a target state of charge ($SoC_d$) for the traction battery 24 based on the following:

$$\frac{SoC_d - SoC_{present}}{\Delta t} = \frac{\sqrt{V_{oc}^2 - 4 P_{BattDes} R} - V_{oc}}{2RQ} \quad (2)$$

where R is the battery internal resistance, $V_{oc}$ is the open-circuit voltage of the battery, Q is the battery capacity, $\Delta t$ is the time duration of the present segment, $SOC_{present}$ is the battery state of charge at the present time. $P_{BattDes}$ is the target battery power for the segment as determined by the control strategy. The equation may be solved for the target state of charge. The target state of charge is the state of charge of the traction battery 24 that is expected upon completion of the present route segment.

The controller may command charging and discharging of the traction battery 24 during the present route segment according to the target state of charge. To charge the traction battery 24, the electric machine 14 may be operated as a generator powered by the engine 18 or the electric machine 18 may be operated as a generator (e.g., regenerative braking) to decelerate the vehicle 12. To discharge the traction battery 24, the electric machine 14 may be operated as a motor to propel the vehicle 12 or other electrical components (e.g., heater) coupled to the traction battery 24 may be operated to draw power from the traction battery 24.

The target state of charge is the state of charge that is planned at the end of the present route segment. At the end of each segment, the computations may be performed again for the next segment. Although a given route may have many segments, a limited number may be considered for the target state of charge planning.

The classification is repeated for each of the segments. Each segment may have an associated classification based on the profiles of vehicle acceleration, wheel power demand, and road grade. When the end of a segment is detected, computations may be performed for the next segment. The end of a segment may be detected based on vehicle location matching an expected location at the end of the segment. The end of the segment may be detected based on the segmentation criteria such as a change in behavior indicative of the segment being complete and transitioning to the next segment.

In some configurations, all of the segments beyond those being considered may be lumped together as one segment to create a virtual segment. This allows some average information from these future segments to be used to compute the target state of charge for the present segment. This virtual segment allows preview information for the entire route to be incorporated into the computation for the earlier segments. Weighted averages may be computed for the virtual segment. For example, a weighted average of vehicle acceleration, road grade, and wheel power may be computed over the virtual segment. A weighting factor may be applied such that the weighting factor decreases as the distance to the destination decreases. This potentially improves performance over those systems that utilize a limited look-ahead horizon. As the destination approaches, fewer segments may be incorporated in the virtual segment as fewer segments remain. As the destination approaches, and the number of remaining segments is less than the number of segments considered in the control strategy, the target state of charge may be determined from the number of remaining segments. As an example, the planning function may utilize three segments. Referring to FIG. 4, at the beginning of the route, segment S1 410 and segment S2 412 may be included. The third segment may be the virtual segment that includes segments S3 through S8. When the first segment is completed (at 406), the next segment may be planned using segment S2 412 and segment S3 414. The third segment may be the virtual segment that includes segments S4 through S8. Processing may continue in this manner until the end of the route (at 408).

As the vehicle traverses the route, the computations may be repeated at the end of each segment. The remaining route information may be segmented into the selected number of segments and the computations may be performed to compute the target state of charge for the end of the present segment. Route information for the last of the selected number of segments may include the averaged data from the remainder of the route.

The controller 302 may receive data indicative of the road grade. For example, a longitudinal acceleration sensor may provide output indicative of the road grade. The sensor output may be compared to thresholds to determine which a present road grade classification. The controller 302 may receive inputs indicative of a speed of the wheels. Alternatively, the controller may receive an input indicative of vehicle speed. A vehicle acceleration value maybe computed based on the rate of change of the vehicle speed. The road grade and vehicle acceleration may be compared to the associated profiles to determine if the route is being followed. If the controller 302 determined that the vehicle performance does not match the intended route, the route may be adjusted. In cases where vehicle acceleration is used, wheel power demand may be substituted and utilized in a similar manner.

Figure 5:
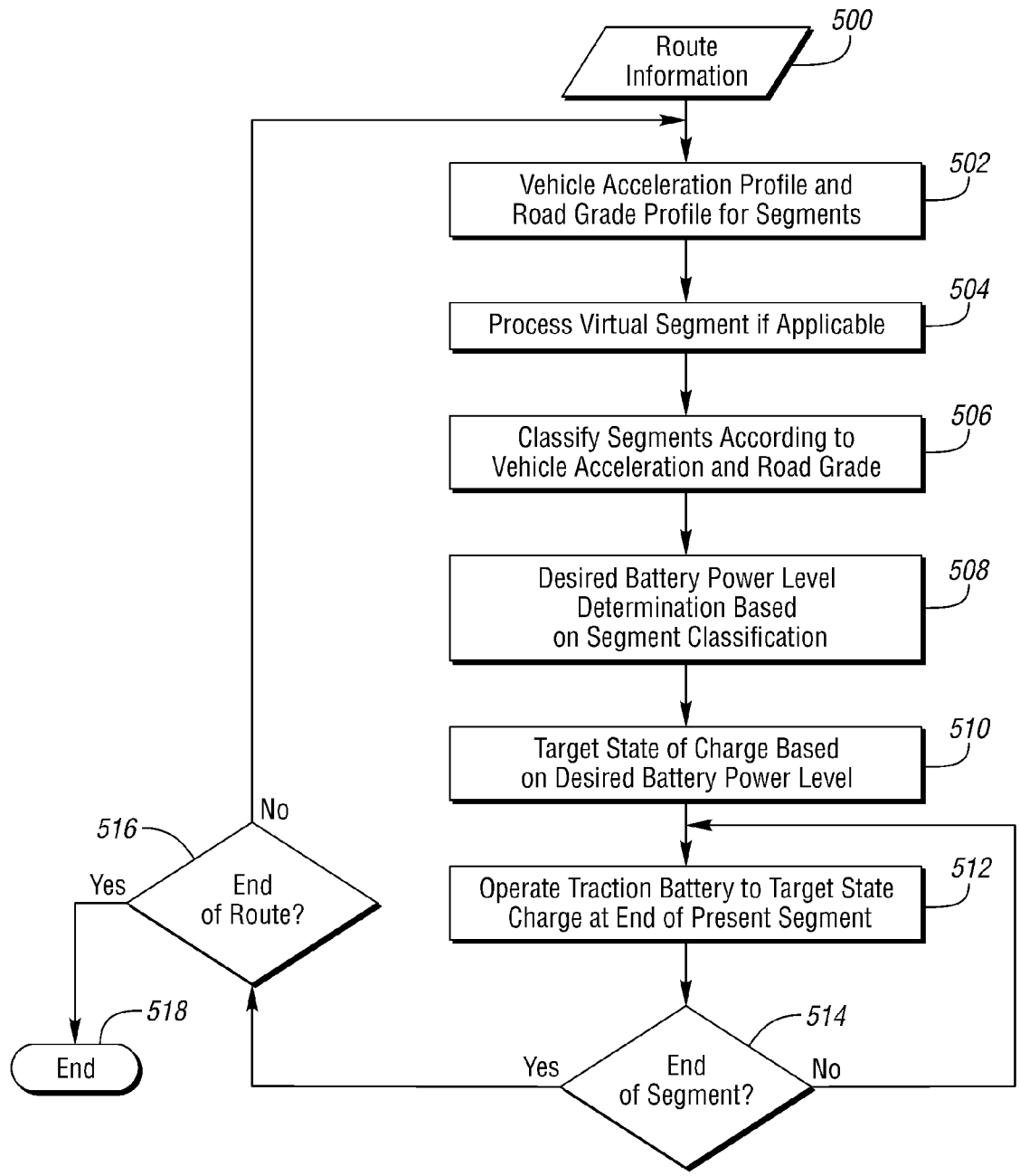
FIG. 5 is a flow chart of a possible sequence of operations for determining a target state of charge for a traction battery using route information.

FIG. 5 depicts a flow chart of a possible sequence of operations to implement the classification strategy described. The operations may be implemented in one or more controllers. Route information may be received at operation 500. The controller may process the route information to obtain the vehicle acceleration profile and the road grade profile for the segments to be processed at operation 502. Operation 502 may include determination of average vehicle acceleration and average road grade over each of the segments. At operation 504, the controller may process the route information for the vehicle acceleration profile and the road grade profile for the virtual segment if applicable. At operation 506, the controller may classify the segments according the vehicle acceleration and the road grade. At operation 508, the controller may determine the desired battery power level for the present segment based on the classification for the segments. At operation 510, the controller may compute the target state of charge for the end of the present segment based on the desired battery power level. At operation 512, the controller commands operation of the traction battery to achieve the target state of charge at the end of the present segment. At operation 514, the controller may check conditions to determine the end of the segment. If the segment is still in progress, execution may pass to operation 512 to continue operating the traction battery. If the end of the segment is detected, operation 516 may be executed. Operation 516 checks conditions to determine if the end of the route is detected. If the end of the route is detected the processing may end 518. If the route is still in progress, execution may pass to operation 502 and the sequence may repeat.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
at least one controller programmed to operate a traction battery to achieve upon completion of a present route segment a target state of charge that is based on a target battery power defined by a classification for a plurality of route segments including the present route segment that results from application of a set of fuzzy rules to vehicle acceleration and road grade associated with the route segments.

2. The vehicle of claim 1 wherein the target battery power is based on a second set of fuzzy rules applied to the classification for each of the route segments.

3. The vehicle of claim 1 wherein the target battery power is based on a predetermined table that is indexed by the classification for each of the route segments.

4. The vehicle of claim 1 wherein the vehicle acceleration is an average vehicle acceleration for each of the route segments and the road grade is an average road grade for each of the route segments.

5. The vehicle of claim 1 wherein the target state of charge is further based on a present state of charge of the traction battery and a duration of the present route segment.

6. The vehicle of claim 1 wherein each of the route segments is mapped to a single classification selected from a plurality of possible classifications.

7. The vehicle of claim 1 wherein each of the route segments is a portion of a route characterized by one or more of a powertrain operating mode, the vehicle acceleration, and the road grade associated with the route segments.

8. The vehicle of claim 1 wherein the plurality of route segments is a number X and route segment X is a virtual segment that includes route data for a remainder of a route such that the target battery power is further defined by the classification for the virtual segment.

9. The vehicle of claim 8 wherein the vehicle acceleration and road grade associated with the segment X are a weighted average vehicle acceleration for the remainder of the route and a weighted average road grade for the remainder of the route.

10. A method comprising:
generating, by a controller, a classification for a plurality of route segments based on a set of fuzzy rules applied to vehicle acceleration and road grade for each of the route segments; and
operating, by the controller, a traction battery over a present route segment to achieve upon completion of the present route segment a target state of charge derived from a target battery power that is based on the classification.

11. The method of claim 10 further comprising generating, by the controller, the target battery power based on a second set of fuzzy rules applied to the classification for the route segments.

12. The method of claim 10 further comprising commanding, by the controller, an electric machine and an engine based on the target state of charge and a present state of charge to operate the traction battery.

13. The method of claim 10 wherein the plurality of segments is a number X and route segment X is a virtual segment that includes route data for a remainder of a route such that the target battery power is further defined by the classification for the virtual segment.

14. The method of claim 13 wherein the vehicle acceleration and road grade associated with the segment X are a weighted average vehicle acceleration for the remainder of the route and a weighted average road grade for the remainder of the route.

15. A vehicle comprising:
at least one controller programmed to operate a traction battery to achieve upon completion of a present route segment a target state of charge that is based on a target battery power defined by a classification for a plurality of route segments including the present route segment that results from application of a set of fuzzy rules to wheel power demand and road grade associated with the route segments.

16. The vehicle of claim 15 wherein the plurality of segments is a number X and route segment X is a virtual segment that includes route data for a remainder of a route such that the target battery power is further defined by the classification for the virtual segment.

17. The vehicle of claim 16 wherein the wheel power demand and road grade associated with the segment X are a weighted average wheel power demand for the remainder of the route and a weighted average road grade for the remainder of the route.

18. The vehicle of claim 15 wherein the target battery power is based on a second set of fuzzy rules applied to the classification for each of the route segments.

19. The vehicle of claim 15 further comprising a navigation module in communication with the at least one controller, wherein the at least one controller is further programmed to receive route information from the navigation module and derive the route segments from the route information.

20. The vehicle of claim 15 wherein the wheel power demand is an average wheel power demand over each of the route segments and the road grade is an average road grade over each of the route segments.

\* \* \* \* \*